May 24, 1938.  H. L. BONE  2,118,148

RAILWAY BOOTLEG

Original Filed Feb. 4, 1936

INVENTOR
Herbert L. Bone.
BY
HIS ATTORNEY

Patented May 24, 1938

2,118,148

UNITED STATES PATENT OFFICE 2,118,148

RAILWAY BOOTLEG

Herbert L. Bone, Forest Hills, Pa., assignor to The Union Switch & Signal Company, Swissvale, Pa., a corporation of Pennsylvania Original application February 4, 1936, Serial No. 62,328. Divided and this application November 5, 1936, Serial No. 109,332

6 Claims. (Cl. 247—1)

My invention relates to railway bootlegs, that is, to devices for connecting electrical conductors with the track rails of a railway.

The present application is a division of my co-pending application, Serial No. 62,328, filed on February 4, 1936, for Railway bootlegs.

I will describe two forms of bootlegs embodying my invention, and will then point out the novel features thereof in claims.

Figure 1:
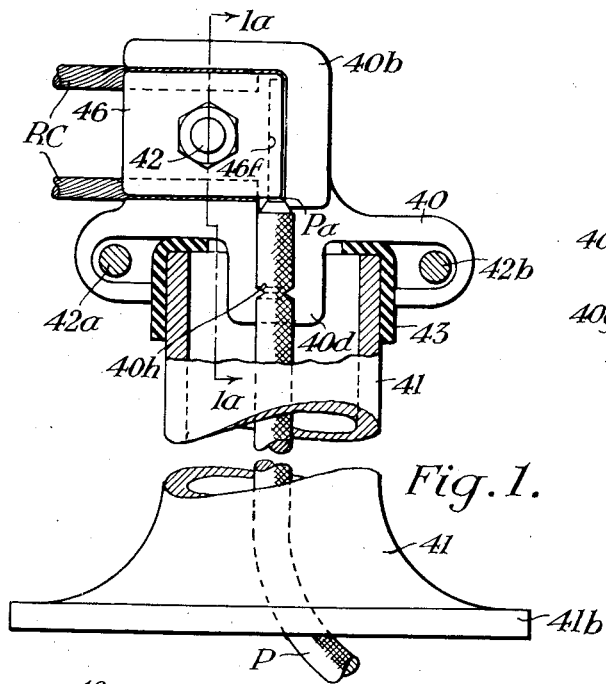
Figure 1A:
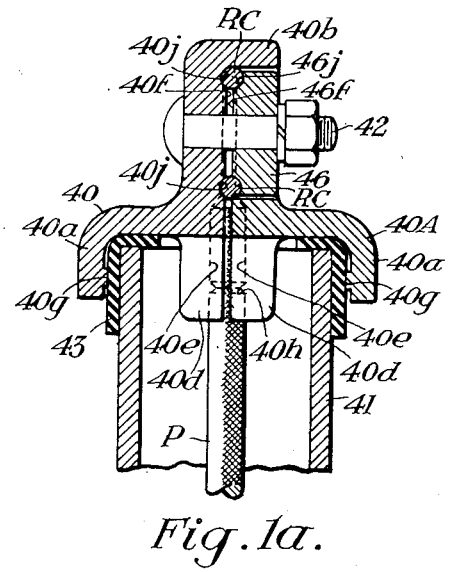
Figure 1B:
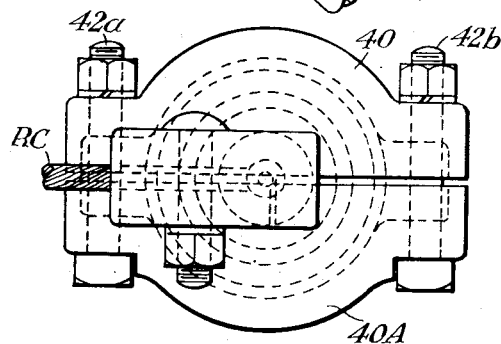
Figure 2:
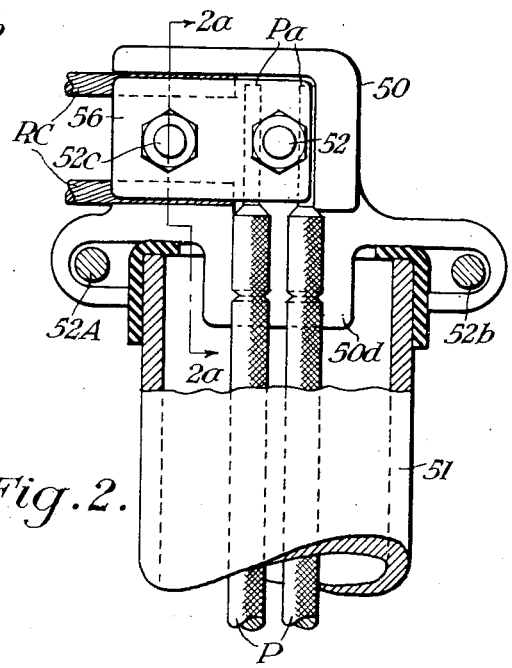
Figure 2A:
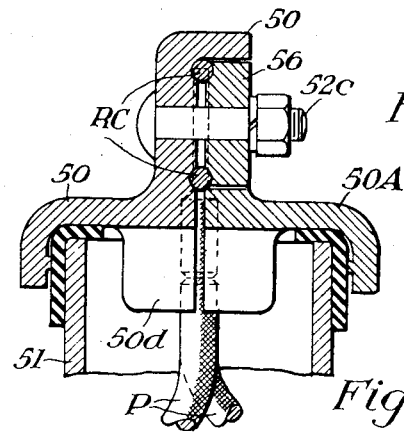

In the accompanying drawing, Fig. 1 is a view partly in side elevation and partly in section showing one form of bootleg embodying my invention, certain of the parts being broken away or removed to better illustrate the construction of the remaining parts. Fig. 1a is a sectional view taken on the line 1a—1a of Fig. 1. Fig. 1b is a top plan view of the bootleg shown in Fig. 1. Fig. 2 is a view similar to Fig. 1 illustrating a modified form of the bootleg shown in Fig. 1. Fig. 2a is a sectional view taken on the line 2a—2a of Fig. 2.

Similar reference characters refer to similar parts in all of the views.

Referring first to Figs. 1, 1a, and 1b, the bootleg in the form here shown comprises a suitable housing such as a pipe 41, the lower end of which, when the bootleg is in service, will be embedded in the ground, and the upper end of which will project above the surface of the ground. The lower end of the pipe is provided with an integral bell shaped flange 41b by means of which the pipe 41 may be securely anchored in place. An electrical conductor, here shown as an insulated wire P, is brought up from the ground through the pipe 41, and the flange 41b, in addition to serving as a means for anchoring the pipe 41 in place, also serves to prevent the formation of a sharp bend in the wire P at the point where the wire enters the pipe.

The bootleg also comprises a head assembly consisting of two clamping members 40 and 40A, each of which is provided at its lower end with a semicircular flange 40a, the inner face of which is formed with a rib 40g. The clamping members 40 and 40A are tightly clamped to the pipe 41 by means of a pair of bolts 42a and 42b, and together form a cap which completely closes the upper end of the pipe. An insulating member 43 comprising a cylindrical lower portion provided at its upper end with an annular inwardly extending flange, is disposed between the sides and top of the pipe and the adjacent portions of the clamping member, and when the two bolts 42a and 42b are tightened, the ribs 40g embed themselves into the cylindrical portion of the member 43, thereby insuring a tight fit between the bootleg head assembly and the pipe 41, and at the same time insulating the head assembly from the pipe.

A depending lug 40d is formed on each of the clamping members 40 and 40A on the inside of the pipe, and each of these lugs is provided with a curved vertically extending groove 40e which together with the groove 40e in the opposite lug forms a passageway through which the insulated wire P is brought out of the upper end of the pipe. The two grooves 40e are each partly closed by a rib 40h which becomes embedded in the insulation of the wire P, when the bolts 42a and 42b are tightened, to assist in holding the wire in place. The groove 40e in the lug 40d of the clamping member 40 extends some distance above the lug, and terminates at its upper end in an axially aligned groove 40f which is formed on the inner face of the clamping member 40, and which is of the proper size to receive a portion Pa of the upper end of the wire P from which the insulation has been removed. The non-insulated portion of the wire also co-operates with a groove 46f which is formed in the inner face of a third clamping member 46 which is bolted to the clamping member 40 by means of a bolt 42, whereby, when the bolt 42 is tightened, the non-insulated portion Pa of the wire is securely clamped between the two clamping members 40 and 46, thus insuring good electrical contact between the wire and the clamping members 40 and 46.

The clamping members 40 and 46 in addition to being provided with mating grooves 40f and 46f for the reception of the non-insulated portion Pa of the wire P are also formed with vertically spaced horizontally extending mating grooves 40j and 46j which receive the two wires of a rail connector RC in such manner that when the bolt 42 is tightened, these latter wires will also be mechanically and electrically connected with the two clamping members 40 and 46. It should be noted that the clamping member 46 is disposed within a recess formed in part by a laterally projecting flange 40b which is provided on the top and one side of the vertically extending upper portion of the clamping member 40, and in part by the clamping member 40A, whereby the direct entrance of water into the bootleg between the clamping members is prevented.

Referring now to Figs. 2 and 2a, the bootleg here shown is similar to the bootleg shown in Figs. 1, 1a, and 1b with the exception that the pipe, which is here designated 51, and the three clamping members, which are here designated 50, 50A, and 56, respectively, have been enlarged somewhat to enable two wires P to be connected with the rail connector RC, the various clamping members in each instance being provided with the proper grooves for the reception of the two wires P, and the two wires of the rail connector RC in the manner shown. Furthermore, to insure rigid gripping of the bare portions Pa of both wires P and of the two wires of the rail connector by the clamping member 56, two bolts 52 and 52c have been provided. All of the remaining parts of the bootleg shown in Figs. 2 and 2a are similar to the corresponding parts shown in Figs. 1, 1a, and 1b, and it is believed, therefore, that further detailed description of the bootleg shown in Figs. 2 and 2a is unnecessary. It should be pointed out, however, that, if desired, the clamping member 56 may be made in two pieces instead of one, the one piece being of the proper size and shape to grip the bare portions of the wires P when the bolt 52 is tightened, and the other piece being of the proper size and shape to grip the two wires of the rail connector RC when the bolt 52c is tightened.

Although I have herein shown and described only two forms of railway bootlegs embodying my invention, it is understood that various changes and modifications may be made therein within the scope of the appended claims without departing from the spirit and scope of my invention.

Having thus described my invention, what I claim is:

1. A bootleg for connecting a conductor with a rail connector comprising a tubular housing projecting upwardly from the ground and enclosing the conductor, a first and a second metal member each provided at its lower end with a depending semicircular flange and together forming a cap for said housing, an insulating member interposed between said metal members and said housing and serving to insulate said metal members from said housing, means for securing said metal members together in such manner that said metal members and said insulating member are securely clamped to said housing, two opposed depending lugs one formed on each of said members within said housing and each provided with a vertical groove which together with the groove in the other lug forms a passageway for bringing said conductor out of said housing, said lugs also being provided with ribs which partly close the associated grooves and which serve to grip the insulation of said conductor, an upwardly extending portion formed on one of said metal members and provided in one side thereof with a vertical groove which aligns with the groove in the associated lug and which receives the bare upper end of said conductor and with a second groove which extends at right angles to said first groove and which receives one end of said rail connector, and a third metal member secured to said upwardly extending portion of said one member adjacent the grooved side thereof for clamping said connector and said conductor in place in the associated grooves.

2. A bootleg for connecting a conductor with a rail connector comprising a tubular housing projecting upwardly from the ground and enclosing the conductor, a first and a second metal member each provided at its lower end with a depending semicircular flange and together forming a cap for said housing, an insulating member interposed between said metal members and said housing and serving to insulate said metal members from said housing, means for securing said metal members together in such manner that said metal members and said insulating member are securely clamped to said housing, two opposed depending lugs one formed on each of said members within said housing and each provided with a groove which together with the groove in the other lug forms a passageway for bringing said conductor out of said housing, said lugs also being provided with means for gripping the insulation of said conductor, an upwardly extending portion formed on one of said members above the associated lug, and means for securing said conductor and said connector to said upwardly extending portion.

3. A bootleg for connecting a pair of conductors with a rail connector comprising a tubular housing projecting upwardly from the ground and enclosing the conductors, a first and a second metal member each provided at its lower end with a depending semicircular flange and together forming a cap for said housing, means for securing said members to but insulating said members from said housing, two opposed depending lugs one formed on each of said metal members and each provided with two vertically extending grooves which mate with the two grooves in the other lug to form passageways for bringing said conductors out of said housing and which grip a portion of said conductor from which the insulation has not been removed, an upwardly extending portion formed on one of said members and provided in one side thereof with two vertically extending grooves which form a continuation of the two grooves in the lug of the associated member and which receive the bare upper ends of said conductors, said upwardly extending member also being provided with a third groove which extends at right angles to the other grooves and which receives one end of said rail connector, and means for clamping the bare portions of said conductors and said connector in their associated grooves.

4. A bootleg for connecting a pair of conductors with a rail connector comprising a tubular housing projecting upwardly from the ground and enclosing the conductors, a first and a second metal member each provided at its lower end with a depending semicircular flange and together forming a cap for said housing, means for securing said members to but insulating said members from said housing, two opposed depending lugs one formed on each of said metal members and each provided with two vertically extending grooves which mate with the two grooves in the other lug to form passageways for bringing said conductors out of said housing and with means for gripping the insulation of the associated conductors, an upwardly extending portion formed on one of said members, and means for clamping the upper ends of said conductors and said rail connector to said upwardly extending portion.

5. A bootleg for connecting an insulated electrical conductor with the two wires of a rail connector comprising a tubular housing projecting upwardly from the ground and enclosing the conductor, a two-part head assembly having coinciding grooves in the central portion thereof for receiving an insulated portion of said conductor within said housing, means for securely clamping the insulated portion of said conductor within the grooves of the head assembly and the head assembly securely in fixed relation to the housing, means for insulating the head assembly from the housing, other grooves in one portion of said head assembly for receiving the two wires of said rail connector as well as a non-insulated portion of said conductor, and means cooperative with said one portion of the head assembly to securely hold said conductor and the wires of said connector in firm electrical contact.

6. A bootleg for connecting an insulated electric conductor with a rail connector comprising a tubular housing projecting upwardly from the ground and enclosing the conductor, a head assembly having one part provided with a ribbed channel for receiving an insulated portion of said conductor and with a cap portion partly surrounding and partly covering the top portion of said housing, said head assembly also having another part provided with a ribbed channel which mates with the channel in the first mentioned part and with a cap portion which partly surrounds and which covers the otherwise uncovered part of said housing, a member of insulating material interposed between said two head parts and said housing for insulating said head parts from said housing, means for holding said head assembly in fixed relation to said insulating member and said housing, and means cooperative with one of said head parts to electrically connect said conductor with said rail connector.

HERBERT L. BONE.